US012801168B2

(12) United States Patent
Catalano et al.

(10) Patent No.: US 12,801,168 B2
(45) Date of Patent: Nov. 17, 2026

(54) COMMAND TO OBTAIN TEMPERATURE DATA

(71) Applicant: INTERNATIONAL BUSINESS MACHINES CORPORATION, Armonk, NY (US)

(72) Inventors: Pasquale A. Catalano, Wallkill, NY (US); Michael James Becht, Poughkeepsie, NY (US); Christopher J Colonna, Ossining, NY (US); Stephen Robert Guendert, Murfreesboro, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 525 days.

(21) Appl. No.: 18/456,682

(22) Filed: Aug. 28, 2023

(65) Prior Publication Data

US 2025/0076905 A1 Mar. 6, 2025

(51) Int. Cl.
*G05D 23/19* (2006.01)

(52) U.S. Cl.
CPC ....... *G05D 23/1917* (2013.01); *G05D 23/193* (2013.01)

(58) Field of Classification Search
USPC .......................................................... 700/299
See application file for complete search history.

(56) References Cited

U.S. PATENT DOCUMENTS 5,479,652 A 12/1995 Dreyer et al.
7,882,354 B2 2/2011 Greco
9,667,476 B2 5/2017 Benner et al.
9,722,863 B2 8/2017 Benner et al.
9,954,866 B2 4/2018 Roth et al.
10,142,261 B2 11/2018 Hathorn et al.
10,210,113 B2 2/2019 Gowravaram et al.
10,460,124 B2 10/2019 Wright
11,169,949 B2 11/2021 Guendert et al.
11,212,001 B1 12/2021 Catalano et al.
11,368,413 B2 6/2022 Colonna et al.
11,520,678 B2 12/2022 Guendert et al.
2008/0225849 A1 9/2008 Firley et al.
(Continued)

FOREIGN PATENT DOCUMENTS

WO WO2014029818 A1 2/2014

OTHER PUBLICATIONS

CN_110838934_A (Year: 2020).*
(Continued)

*Primary Examiner* — Hien D Khuu

(74) *Attorney, Agent, or Firm* — Edward J. Wixted, III, Esq.; Blanche E. Schiller, Esq.; Heslin Rothenberg Farley & Mesiti P.C.

(57) ABSTRACT

A receiving network device obtains a command built to enable a control program of a device coupled to the receiving network device to obtain temperature data of one or more selected units of a network. The command includes an indication of the one or more selected units for which the temperature data is to be obtained. The receiving network device obtains the temperature data of the one or more selected units indicated by the command and provides a response to the request for the temperature data of the one or more selected units.

20 Claims, 6 Drawing Sheets

(56) References Cited

U.S. PATENT DOCUMENTS

| | | | | |
|---|---|---|---|---|
| 2014/0055776 | A1 * | 2/2014 | Hathorn | H04B 10/0775 356/73.1 |
| 2015/0071287 | A1 | 3/2015 | Berman | |
| 2015/0180753 | A1 * | 6/2015 | Wei | H04L 43/0811 370/242 |
| 2016/0021118 | A1 * | 1/2016 | Roth | H04L 63/08 726/4 |
| 2016/0204980 | A1 * | 7/2016 | Benner | H04L 43/16 370/242 |
| 2017/0164526 | A1 * | 6/2017 | Govindarajan | G05D 23/1917 |
| 2020/0076585 | A1 | 3/2020 | Sheppard et al. | |
| 2020/0396182 | A1 * | 12/2020 | Colonna | H04L 45/12 |
| 2022/0052968 | A1 | 2/2022 | Catalano et al. | |

OTHER PUBLICATIONS

Anonymous, "A Method to List Releasable SR-IOV Logical Ports for All Cases," IPCOM000230907D, Sep. 17, 2013, pp. 1-2 (+ cover).
Anonymous, "Automatically Correcting Event Flooding by Network Devices via a Network Management System," IP.com No. IPCOM000264650D, Jan. 18, 2021, pp. 1-9 (+ cover).
Anonymous, "High Efficiency Power Management With Dynamic Phase Control," IP.com No. IPCOM000181795D, Apr. 13, 2009, pp. 1-4 (+ cover).
Anonymous, "Method and Apparatus to Capture and Represent Power Consumption Data at The Application Level In a Computing Machine," IP.com No. IPCOM000191496D, Jan. 6, 2010, pp. 1-3 (+ cover).
Anonymous, "Method for Fastest-Path Discovery and Management in SAN Environment by Multipath-Driver," IP. com No. IPCOM000201810D, Nov. 23, 2010, pp. 1-3 (+ cover).
Anonymous, "Method for Targeted Configuration of SAN Devices," IP.com No. IPCOM000228595D, Jun. 20, 2013, pp. 1-4 (+ cover page).
Ansit, "Fibre Channel—Link Services—5 (FC-LS-5)—REV 5.01," Jan. 12, 2021, pp. 1-236 (+ cover pages and index).
Brocade, "Ficon Administrator's Guide," 53-1002473-02, Nov. 15, 2012, pp. 1-94.
Cisco, "Command Reference for Cisco NCS 1001," Published Jul. 14, 2017 (modified Feb. 22, 2023), pp. 1-48.
Driever, P.G., et al., "Securing the enterprise SAN with IBM Fibre Channel Endpoint Security," IBM J. Res & Dev., vol. 64, No. 5/6, Paper 4, Sep./Nov. 2020, pp. 4:1-4:8.
Fortinet, "Administration Guide—Standalone Mode—FortiSwitchOS 7.2.3," Apr. 10, 2023, pp. 1-418.
Guendert, Steve, "To Cup, or Not to Cup? That is the (Ficon) Question!," Brocade, Computer Measurement Group International Conference, Dec. 2007, pp. 1-36.
Keysight Technologies, "N7744A 4—Channel Optical Multiport Power Meter, N7745A 8—Channel Optical Multiport Power Meter Data Sheet," Dec. 2, 2017, pp. 1-7.
Micron, "The Smart Command Feature Set for the P200e SSD Firmware 0142," TN-FD-10: P400e SS Smart Implementation for FW0142 Introduction, Dec. 2012, pp. 1-41.
Network Technolgies Incorporated, "Secure Remote Power Control Unit with Environmental Monitoring," 2021 (no further date information available), 3 pages.
Ogu, Emmanuel C. et al., "Temperature Control System," Apr. 2011, 94 pages.
Anonymous, "Monitoring, Diagnostic, and Alternate-Route Detection Tool for SAN," IP.com No. IPCOM000143262D, Nov. 17, 2006, pp. 1-2 (+ cover).
Anonymous, "PCIe Throttling Based on Network Congestion," IP.com No. IPCOM000263344D, Aug. 20, 2020, pp. 1-6.
Anonymous, "Using Data Recognition for Storage Optimization," IP.com No. IPCOM000266245D, Jun. 28, 2021, pp. 1-6 (+ cover).
Cisco, "Configure Port Settings on Optimize Traffic Flow on a Switch," 2021 (no further date information available), pp. 1-7.
Fortinet, "Administration Guide—Standalone Mode FortiSwitchOS 7.2.2," Feb. 28, 2023, 412 pages.
White Paper, "Brocade Cup Diagnostics and the IBM Health Checker for z/OS," 2021 (no further date information available), pp. 1-16.
Guendert Steve; "Cup Diagnostics and IBM's Health Checker for z/OS", Brocade Communications, pp. 1-40, downloaded from internet Sep. 13, 2024.

* cited by examiner

500

| CODE (502) | COMMAND (504) | DESCRIPTION (506) | OPTIONAL OTHER FIELDS (510) |
|---|---|---|---|
| CODE | CONTROL UNIT PORT | OBTAIN TEMPERATURE DATA | OPTIONAL OTHER INFORMATION |

FIG. 5A

550

552

| WORD | BYTE 0 | BYTE 1 | BYTE 2 | BYTE 3 |
|---|---|---|---|---|
| 0 | PORT ID | SOURCE PORT ADDRESS IDENTIFIER ~ 558 | | |
| 1 | SAN DEVICE ADDRESS IDENTIFIER ~ 560 | | | |
| 2 | COMPONENT IDENTIFIER ~ 562 | | | |
| 3 | TEMPERATURE VALUE ~ 566 | | | |
| 4 | MEASUREMENT INDICATOR ~ 568 | | | |
| 5-15 | | | | |

FIG. 5B

COMMAND TO OBTAIN TEMPERATURE DATA

BACKGROUND

One or more aspects relate, in general, to facilitating processing within a computing environment, and in particular, to facilitating communication within the computing environment.

Certain computing environments use networks, such as storage area networks and/or other networks, to provide access between devices. For example, a storage area network provides data paths between one or more host devices and one or more storage devices. The data paths may include network devices, such as switches, and/or other devices, as well as communication links. The links may be fiber optic or other types of cables or even wireless.

A device, such as a network device, has various components, including ports used to receive and/or transmit data (e.g., via optical transceivers of the ports), power supply units, etc. Proper functioning of the components facilitates optimal functioning of the device.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media. The program instructions collectively stored include program instructions to obtain, by a receiving network device, a command built to enable a control program of a device coupled to the receiving network device to request temperature data of one or more selected units of a network. The command includes an indication of the one or more selected units for which the temperature data is requested. The program instructions collectively stored further include program instructions to obtain, by the receiving network device, the temperature data of the one or more selected units indicated by the command, and program instructions to provide, by the receiving network device, a response to the request for the temperature data of the one or more selected units.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 5A depicts one example of a control unit port command to obtain temperature data, in accordance with one or more aspects of the present disclosure;

FIG. 5B depicts one example of information transmitted based on the control unit port command of FIG. 5A, in accordance with one or more aspects of the present disclosure.

DETAILED DESCRIPTION

Figure 1:
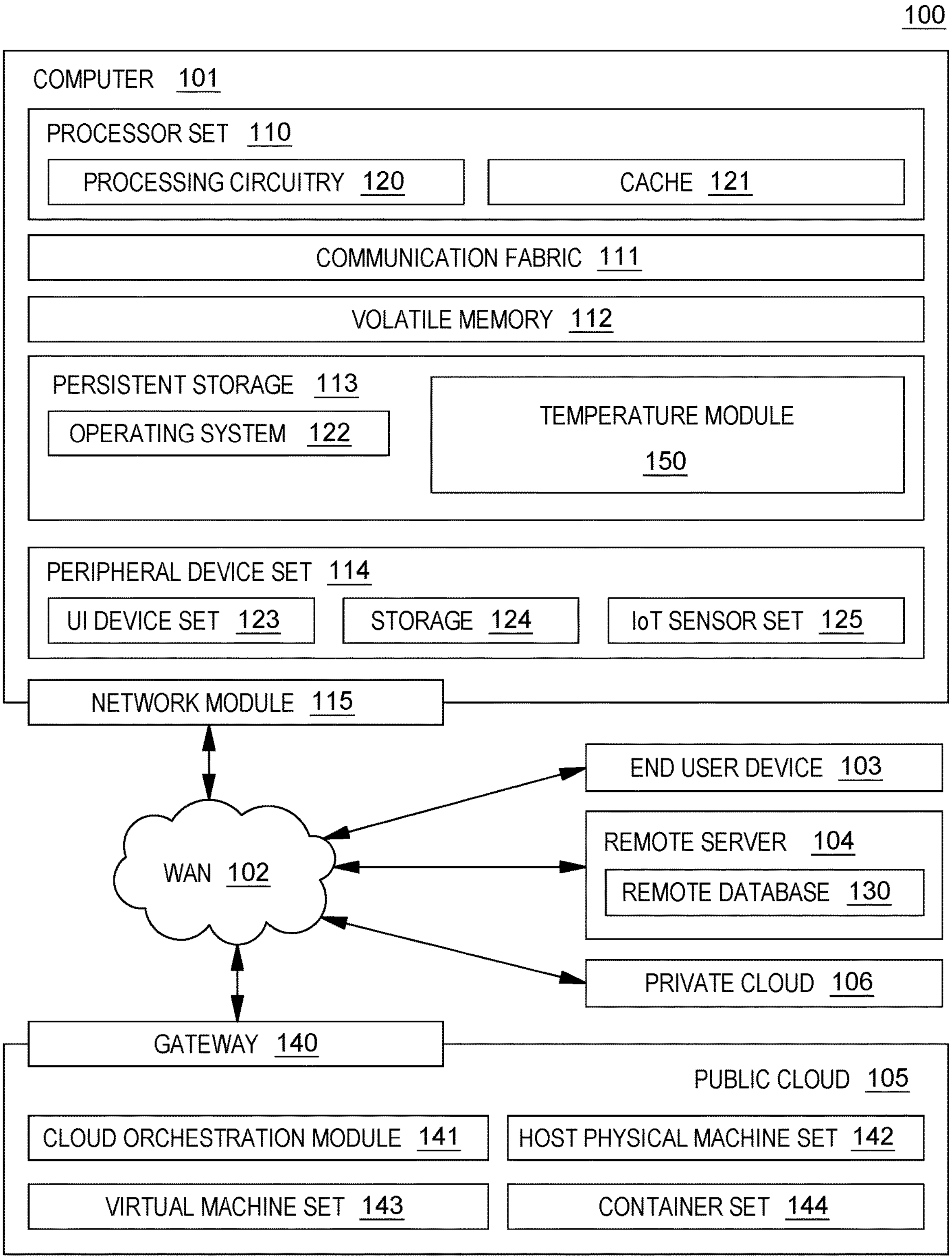
FIG. 1 depicts one example of a computing environment to incorporate, perform and/or use one or more aspects of the present disclosure.

In accordance with one or more aspects of the present disclosure, a capability is provided to facilitate processing within a computing environment. In one aspect, the capability includes facilitating communication within the computing environment by improving the use of devices/device components of a network, such as, for instance, a storage area network used to provide data paths between host devices and storage devices.

In one example, to improve utilization of devices/device components of a network (e.g., a storage area network), temperature data of one or more selected units of a network is obtained (e.g., gathered, collected, determined, provided, monitored, accessed, etc.). A selected unit is, for instance, a device and/or a component of a device. As an example, a device is a network device (e.g., switch, director, appliance, etc.) of a network (e.g., storage area network) and components of the network device include, for instance, one or more ports that receive and/or transmit data (e.g., via optical transceivers), one or more power supply units, one or more fans, a chassis, one or more blades, etc. Components of the network device may be part of the network device, include the network device and/or be used by the network device, and one or more of the components may be temperature monitored. Although example components of a network device are provided, a network device may have additional, fewer and/or other components, including additional, fewer and/or other temperature monitored components. Many examples are possible.

The obtaining of temperature data is performed based on, e.g., a command built and sent from one device, e.g., a host device, to another device, e.g., a receiving network device. The command is built by, using and/or on behalf of a control program (e.g., an operating system, other control program, etc.) of the one device to enable the control program to request temperature data. The receiving network device receives the command and based on a command structure of the command, obtains the temperature data. In one example, the receiving network device is part of a storage area network, and the device building/transmitting the command may be part of the storage area network or separate therefrom and coupled to the receiving network device, and optionally, to one or more other devices of the storage area network.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., obtains temperature data and/or performs one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as temperature code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Further details relating to one or more components/modules of FIG. 1 used in accordance with one or more aspects of the present disclosure are described herein. For example, storage 124 is provided, in one example, by a storage network, such as a storage area network (SAN). In one example, a storage area network includes a plurality of devices coupled to one another via a plurality of connections. As examples, the plurality of devices includes one or more endpoint devices (e.g., one or more servers, such as computer(s) 101; one or more processors and/or nodes of a processor set (e.g., processor set 110); one or more remote servers, such as remote server(s) 104; and/or one or more end user devices, such as end user device(s) 103; etc.), one or more network devices (e.g., switches, directors, appliances, etc.), one or more storage devices, and/or one or more other devices; and the connections include, for instance, links and/or other connections. Many examples are possible.

One example of network devices of a storage area network is described with reference to FIG. 2. In one example, a storage area network 200 includes one or more network devices 210, such as one or more switches, directors, appliances, etc. As examples, one or more of network devices 210 support the Fibre Channel and/or Fibre Channel over Ethernet protocols. Although the Fibre Channel and/or Fibre Channel over Ethernet protocols are specified herein, one or more of the network devices may support other protocols. Fibre Channel and/or Fibre Channel over Ethernet protocols are just examples. Further, in one or more examples, storage area network 200 may include a network fabric, such as a switched fabric, which includes, for instance, a plurality of network devices (e.g., directors or switches based on fibre technology, other directors or switches and/or other network devices) coupled to one another via one or more connections (e.g., inter-switch links, other links and/or other connections). Various examples are possible.

Each network device 210 includes, for instance, one or more components (e.g., ports) that connect a network device to one or more other devices, including one or more other network devices and/or one or more other devices (referred to herein as non-network devices) via one or more links. A port (e.g., port 212) may receive and/or transmit data. In one example, a port (e.g., port 212) may include one or more transceivers (e.g., transceivers 214) to transmit (TX) 216 and/or receive (RX) 218 data. The transceivers may be, for instance, pluggable, optical transceivers that plug into the port(s).

In one or more examples, other components of a network device (e.g., network device 210) include, for instance, a chassis (e.g., a physical container or hardware), one or more blades within one or more chassis slots, one or more power supply units, one or more fans, etc. Various components of the network device, including, but not limited to, the transceivers of the ports, chassis, blades, power supply units and/or fans are temperature monitored. Further, the network device may also be temperature monitored. Other examples are possible.

In one example, one or more of network devices 210 is coupled to a device 220 via one or more links 230. As examples, the device may be a computer, such as computer 101 or other computer; a processor or node, such as a processor or node of processor set 110 or other processor or node; a remote server, such as remote server 104 or other remote server; an end user device, such as end user device 103 or other end user device; or other non-network devices of a computing environment, such as computing environment 100. The device also includes, in one example, one or more ports 222 that connect the device to one or more network devices 210 and/or to other non-network devices. In one example, ports 222 of device 220 and/or of at least some other non-network devices (such as other endpoint devices, etc.) are referred to, in one example, as channel ports, while ports 212 of network device 210 are referred to, for instance, as switch ports. Other examples are possible.

In one example, device 220 is separate but coupled to the storage area network. In another example, it is part of the storage area network. In one example, device 220 includes an operating system (e.g., operating system 224) or another control program that sends commands from the device to, e.g., a network device coupled to the device. In one example, the device (e.g., device 220) is a host device. Other examples and/or variations are possible.

Figure 2:
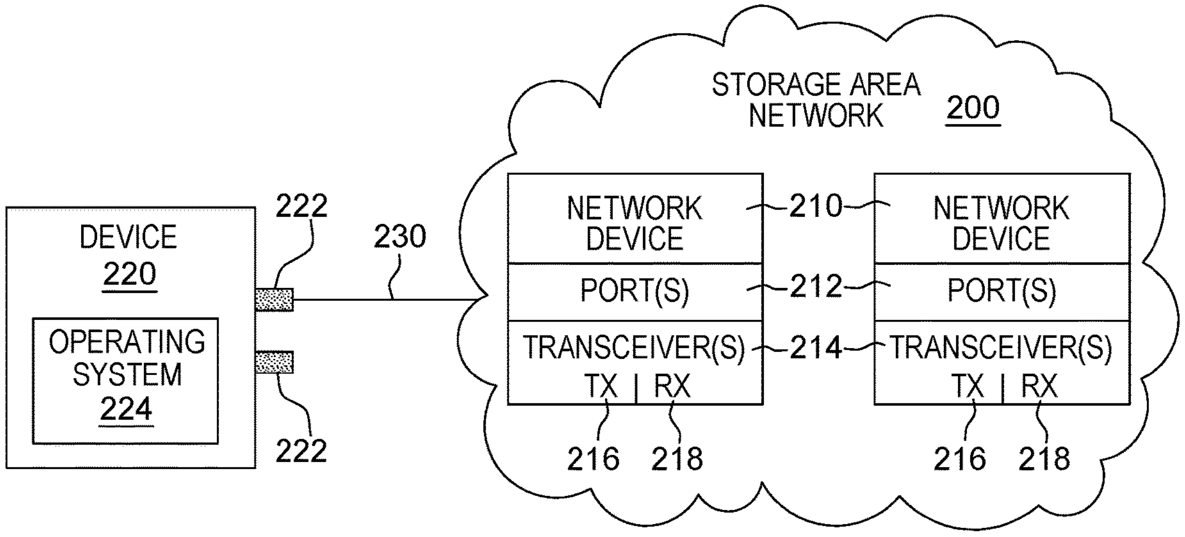
FIG. 2 depicts one example of aspects of a storage area network to incorporate, perform and/or use one or more aspects of the present disclosure.

The storage area network of FIG. 2 is only one example. Storage area networks may include additional, fewer and/or other devices (e.g., network devices, non-network devices, etc.), ports and/or connections. Many examples and variations are possible. For instance, the number, type and interconnections of the devices and connections in each storage area network may be different. Further, storage area networks may support other transmission protocols. Again, many variations are possible.

In one example, to improve processing of and/or related to a storage area network (e.g., storage area network 200) and/or of other networks, temperature data is obtained for one or more selected units of the storage area network. For example, temperature levels are obtained for one or more network devices of the storage area network and/or one or more components of the one or more network devices. Other examples are possible.

In one or more aspects, the obtaining of temperature data may be triggered based on, for instance, a command requesting temperature data. In one or more aspects, the command may be built, transmitted and received using a module, such as a temperature module (e.g., temperature module 150 of FIG. 1), that includes code or instructions used to obtain temperature data, in accordance with one or more aspects of the present disclosure.

Figure 3A:
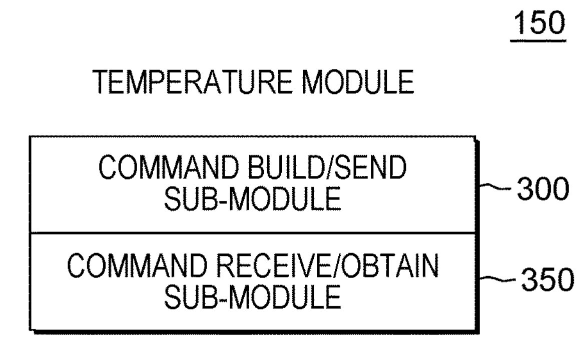
FIG. 3A depicts one example of sub-modules of a temperature module of FIG. 1, in accordance with one or more aspects of the present disclosure.

In one or more aspects, referring to FIG. 3A, a temperature module (e.g., temperature module 150) includes, in one example, various sub-modules to be used to obtain temperature data and/or to perform tasks relating thereto. The sub-modules are, e.g., computer readable program code (e.g., instructions) in computer readable media, e.g., storage (persistent storage 113, cache 121, storage 124, other storage, as examples). Although, as an example, temperature module 150 is depicted in FIG. 1 in persistent storage 113, one or more sub-modules may be in other storage, such as storage 124, etc. Many variations are possible.

The computer readable media may be part of one or more computer program products and the computer readable program code may be executed by and/or using one or more devices (e.g., one or more computers, such as computer(s) 101; one or more servers, such as remote server(s) 104; one or more end user devices, such as end user device(s) 103; one or more processors or nodes, such as processor(s) or node(s) of processor set 110; processing circuitry, such as processing circuitry 120 of processor set 110; one or more network devices (e.g., networks devices 210 (FIG. 2)); and/or other devices, etc.). Additional and/or other computers, servers, end user devices, processors, nodes, processing circuitry, network devices and/or other devices may be used to execute one or more of the sub-modules and/or portions thereof. Many examples are possible.

Example sub-modules of temperature module 150 include, for instance, a command build/send sub-module 300 to build a control unit port command to be used to obtain temperature data and to send the command to a receiving device (e.g., a receiving network device); and a command receive/obtain sub-module 350 to receive the command and obtain the requested temperature data. Additional, fewer and/or other sub-modules may be used to implement the obtaining of temperature data. Other variations are possible. Although various sub-modules are described, a temperature module, such as temperature module 150, may include additional, fewer and/or different sub-modules. A particular sub-module may include additional code, including code of other sub-modules, less code, and/or different code. Further, additional and/or other modules may be used to obtain temperature data and/or perform related tasks. Many variations are possible.

Further details relating to command build/send sub-module 300 are described with reference to FIG. 3B and further details relating to command receive/obtain sub-module 350 are described with reference to FIG. 3C. In one example, command build/send sub-module 300 is executed on one or more non-network devices, such as device(s) 220, and command receive/obtain sub-module 350 is executed on one or more network devices, such as network device(s) 210. In one example, a non-network device (e.g., non-network device 220) executing the command build/send sub-module is coupled to, but separate and independent of a network device (e.g., network device 210) executing the command receive/obtain sub-module. Other examples/variations are possible.

Figure 3B:
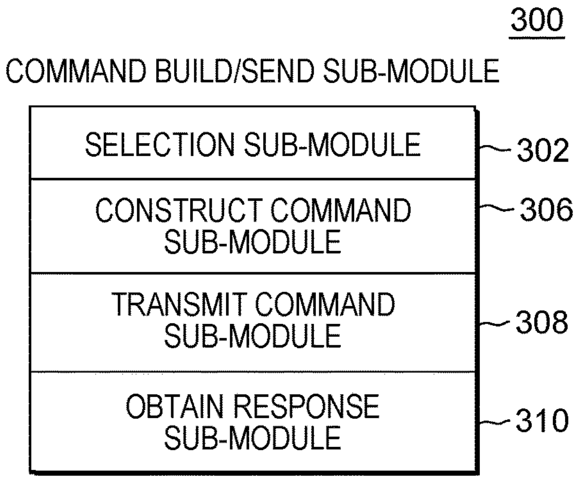
FIG. 3B depicts one example of sub-modules of a command build/send sub-module of the temperature module of FIG. 3A, in accordance with one or more aspects of the present disclosure.

Referring to FIG. 3B, in one example, command build/send sub-module 300 includes a selection sub-module 302 to be used to choose one or more selected units for which temperature data is to be obtained; a construct command sub-module 306 to be used to build a command, such as a control unit port command, to obtain temperature data; a transmit command sub-module 308 to be used to send the built command (e.g., control unit port command) to a receiving device (e.g., a receiving network device 210); and an obtain response sub-module 310 to obtain the temperature data from the receiving network device and/or perform one or more tasks based on the received data. Additional, fewer and/or other sub-modules may be used to implement the command build/send processing. Other variations are possible.

Figure 3C:
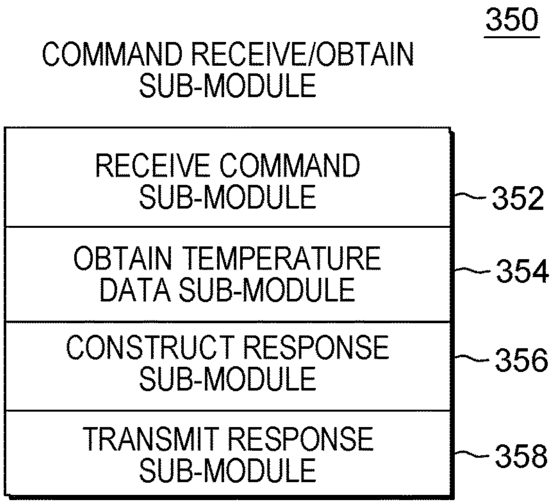
FIG. 3C depicts one example of sub-modules of a command receive/obtain sub-module of the temperature module of FIG. 3A, in accordance with one or more aspects of the present disclosure.

Referring to FIG. 3C, in one example, command receive/obtain sub-module 350 includes a receive command sub-module 352 to be used to receive the built command (e.g., control unit port command) at the receiving network device (e.g., a network device 210); an obtain temperature data sub-module 354 to obtain the temperature data of the indicated selected unit(s); a construct response sub-module 356 to construct a response to the command request for temperature data; and a transmit response sub-module 358 to transmit the constructed response to the transmitting device (e.g., operating system of the transmitting device; e.g., operating system 224). Additional, fewer and/or other sub-modules may be used to implement the command receive/obtain processing. Other variations are possible.

One or more of the sub-modules are used, in accordance with one or more aspects of the present disclosure, to build a command and to transmit the command to obtain temperature data and/or to perform other tasks related thereto, as further described with reference to FIG. 4. In one example, a command build/send process (e.g., a command build/send process 400) is implemented using one or more of the sub-modules (e.g., one or more of sub-modules 300-310) and is executed by a device, such as device 220. In one example, device 220 is a computing device (e.g., computer (e.g., computer 101, other computer, etc.), a server (e.g., server 104, other server, etc.), an end user device (e.g., end user device 103), a processor, node and/or processing circuitry, etc. (e.g., of processor set 110 or other processor sets), and/or one or more other computing devices, etc.). Although example devices, computers, servers, end user devices, processors, nodes, processing circuitry and/or computing devices are provided, additional, fewer and/or other computers, servers, end user devices, processors, nodes, processing circuitry and/or computing devices may be used for the command build/send process and/or other processing. Various options are possible.

In one example, one or more aspects of command build/send process 400 (also referred to as process 400) are implemented and/or executed by, on behalf of and/or using a control program (e.g., operating system 224), other control programs, and/or other operating systems executing on a device, such as device 220 and/or other non-network devices. The device (e.g., device 220) executing the control program (e.g., operating system 224) to build and send the command is coupled to, but separate from, a network device (e.g., network device 210) receiving the command and obtaining the requested temperature data. In one example, the operating system (e.g., operating system 224) of the transmitting device (e.g., non-network device 220) is the z/OS® operating system offered by International Business Machines Corporation, Armonk, New York. The z/OS operating system, however, is only one example operating system; other operating systems of International Business Machines Corporation and/or other entities/companies may include and/or use one or more aspects of the present disclosure. z/OS is a trademark or registered trademark of International Business Machines Corporation in at least one jurisdiction.

In one example, the command being built and transmitted is an architected command of a selected architecture. As an example, the selected architecture is the z/Architecture® instruction set architecture offered by International Business Machines Corporation, Armonk, New York. One embodiment of the z/Architecture instruction set architecture is described in a publication entitled "IBM® z/Architecture—Principles of Operation," SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. The z/Architecture instruction set architecture and the z/OS operating system are only examples and are not meant to be limiting in any way. z/Architecture and IBM are trademarks or registered trademarks of International Business Machines Corporation in at least one jurisdiction.

Figure 4:
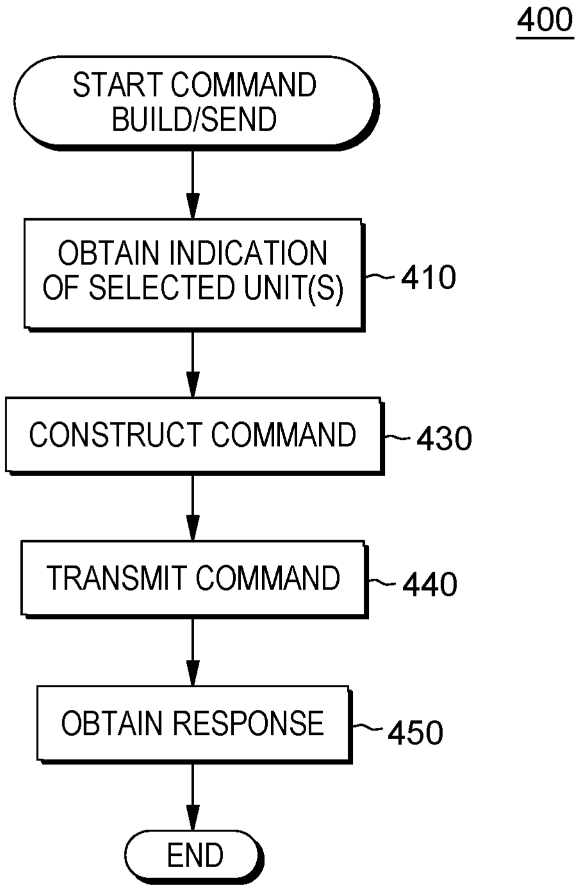
FIG. 4 depicts one example of a command build/send process, in accordance with one or more aspects of the present disclosure.

In one example, referring to FIG. 4, process 400 obtains 410 an indication of one or more selected units for which temperature data is to be obtained. For example, one or more selected units of interest are determined and provided to process 400. The selected units may be, for instance, network devices and/or components of network devices, such as, e.g., transceivers (e.g., optical transceivers) of one or more ports, power supply units, chassis, blades, fans, and/or other temperature monitored components. The selected units may be, for instance, one or more components of a storage area network or other network. The selections may be performed by, for instance, a user at a device, such as device 220, via, e.g., an operating system (e.g., operating system 224) or the selections may be determined by the host (e.g., operating system) or other application, control program, etc. In one example, the control program (e.g., operating system 224) executing on the non-network device (e.g., non-network device 220) determines, based on information it possesses or obtains (e.g., input/output (I/O) configuration data, potential or actual I/O configuration changes, performance data, etc.), that it would be beneficial to have temperature data of selected units (e.g., network devices, transceivers (e.g., optical transceivers) of one or more ports, power supply units, chassis, blades, fans, and/or other temperature monitored components). Other examples are possible.

The selected units may be selected periodically, randomly, based on a schedule, based on I/O configuration changes, based on a performance concern or a perceived performance concern or for any other reason.

Process 400 constructs 430 a command, such as a control unit port command, to obtain temperature data of one or more selected units. For instance, the process (e.g., using the operating system) constructs the control unit port command using the selected unit information. In one example, it populates a command structure of the command, an example of which is described below, with, e.g., an identifier of the receiving network device, an identifier of the transmitting device, one or more identifiers of one or more network devices for which temperature data is to be obtained and/or one or more identifiers of one or more components of one or more network devices for which temperature data is to be obtained. Other examples are possible.

One example format of a command to be constructed is depicted in FIG. 5A. As shown, in one example, a command format 500 includes a code field 502, which includes a unique code identifying the command; a command field 504, which indicates the command, such as a control unit port command (and may or may not specify what action the command is performing); a description field 506, which provides a description of the command, such as obtain temperature data; and optionally, there may be one or more other fields 510. As examples, the one or more other fields may include one or more of a test key and increment field, which indicates whether a test key and increment command with an equal test comparison is to be included in the same channel command word chain prior to this command; an identify field, which indicates whether an identify command is to be included in the same channel command word chain prior to this command; an accepted with host control prohibited field, which indicates whether this command will be accepted or not when host control is prohibited; and/or a count field, which indicates an amount of data to be transferred. Additional, fewer and/or other fields are possible. Other command formats are also possible. The command format may include additional, fewer and/or other fields/information. Many variations are possible.

One example of the information transferred using the control unit port command is described with reference to an example command structure depicted in FIG. 5B. As examples, temperature data may be requested for one or more selected units, and the command structure would reflect that and/or one or more command structures may be used. Various examples are possible.

In one example, a command structure 550 includes, for instance:

- Port ID 552 (byte 0 of word 0): This field indicates an identifier of a port of a receiving network device to receive the command. In other examples, it may be a receiving network device identifier or other identifier. Many examples are possible.

Source Port Address Identifier 558 (e.g., bytes 1-3 of word 0): This field includes information regarding the port on the endpoint side. For instance, an identifier of the port used to transmit the command.

Storage Area Network (SAN) Device Address Identifier 560 (e.g., bytes 0-2 of word 1): This field includes, for instance, a 3 byte address identifying a device (e.g., a network device) for which temperature data is requested. In other examples, one or more device address identifiers may be specified. Further, in other examples, this field may be left blank or ignored if temperature data is not being requested for one or more network devices (but instead for components of the devices which are specified by another field (e.g., field 562)). In one example, this field may not be included in the command structure. Many examples are possible.

In one example, this field may include an indication of whether temperature data is being requested for one or more network devices. For instance, field 560 may include an indicator (e.g., a bit) that when set to one value (e.g., 1) indicates a request for temperature data for one or more network devices and based on the indicator being set to another value (e.g., 0), indicates that temperature data for one or more network devices is not being requested. If the indicator is set to indicate that temperature data for one or more network devices is not being requested, then one or more device address identifiers may be included in this field to be used to further indicate the one or more components being selected. In another example, the field may include a mask that indicates for each network device address identifier whether temperature data is being requested for its corresponding network device. Other examples are possible.

Component Identifier 562 (e.g., word 2): This field includes, for instance, one or more identifiers of one or more components of one or more networks devices or of a storage area network (or other network) for which temperature data is requested. The one or more components include, for instance, one or more transceivers (e.g., optical transceivers) of one or more ports, one or more power supply units, one or more chassis, one or more blades, one or more fans, and/or one or more other temperature monitored components. Other examples are possible.

In one example, this field may be left blank or ignored if temperature data is not being requested for specific components. Many examples are possible.

In one example, this field may include an indication of whether temperature data is being requested for one or more components of one or more network devices. For instance, field 562 may include an indicator (e.g., a bit) that when set to one value (e.g., 1) indicates a request for temperature data for one or more components and based on the indicator being set to another value (e.g., 0), indicates that temperature data for one or more components is not being requested. In another example, the field may include a mask that indicates for each component identifier whether temperature data is being requested for its corresponding component. Other examples are possible.

Temperature Value 566 (e.g., word 3): This field includes, for instance, temperature levels of the one or more indicated selected units (e.g., one or more network devices and/or one or more components of one or more network devices or of a storage area network (or other network)). Other examples are possible.

Measurement Indicator 568 (e.g., byte 0 of word 4): This field includes, for instance, a measurement indicator (e.g., two bits or another number of bits) specifying a measurement type for the temperature values. Example bit indicators for example measurement types include, for instance: 00—Kelvin; 01—Celsius; and 10—Fahrenheit. Other examples are possible.

Although in the example information described herein, specific words/bytes/bits are indicated for the fields, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. In one or more embodiments, one or more of the fields may include an indicator (e.g., a bit) to be used to indicate whether that particular data of the field is to be populated/returned. In other examples, it is assumed that the data of the fields is to be populated/returned. Further, one or more fields may be ignored, left blank and/or not included in the command structure. Moreover, other example information and/or command structures may include additional, fewer, and/or other fields. Many variations and examples are possible.

Returning to FIG. 4, process 400 transmits 440 the built command to a receiving device. For instance, process 400 transmits the command from, e.g., the operating system (e.g., operating system 224) to a selected receiving network device (e.g., a selected network device 210 (e.g., a switch, director, appliance, etc.)) using, e.g., a local port (e.g., a port 222) and one or more links (e.g., links 230). The receiving network device receives the command (e.g., using a port (e.g., a port 212)) and based on the command, obtains the temperature data for the one or more selected units identified in the command. As examples, the receiving network device determines the data itself and/or uses other devices (e.g., other network devices and/or other devices) and/or components of the storage area network to obtain the requested temperature data. The receiving network device prepares a response that includes the requested temperature data and forwards the response to the transmitting device (e.g., device 220). Various examples are possible.

In one example, process 400 obtains 450 a response based on the requested temperature data. As an example, the response includes the command structure (e.g., command structure 550) with the requested data. Other examples are possible.

Figure 6:
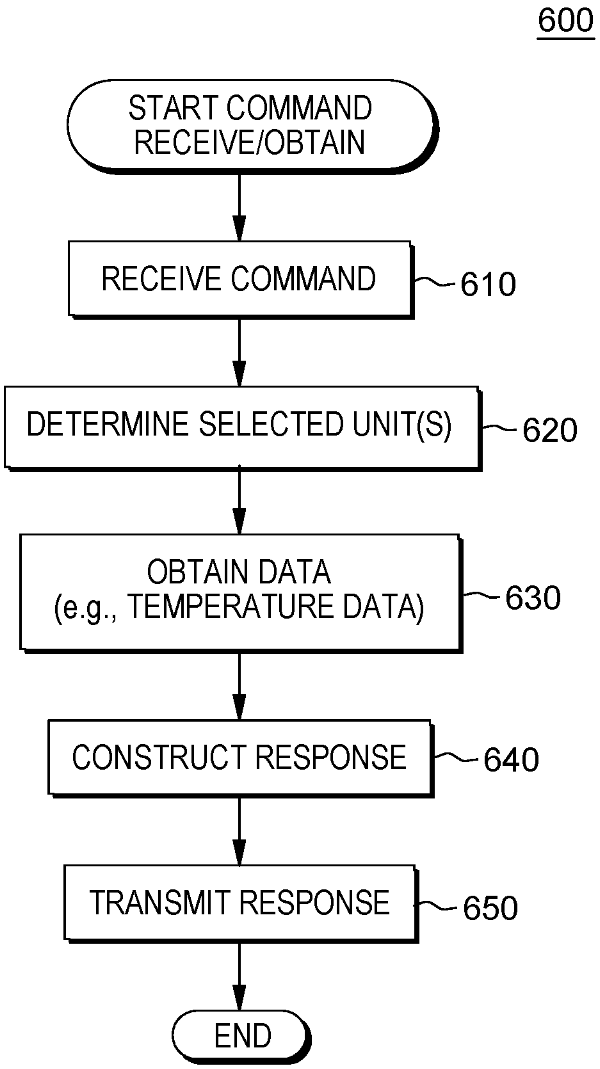
FIG. 6 depicts one example of a command receive/obtain process, in accordance with one or more aspects of the present disclosure.

In one example, the constructed command is received at the receiving device (e.g., a receiving network device 210) in order to obtain temperature data of one or more selected units. In one example, one or more sub-modules are used, in accordance with one or more aspects of the present disclosure, to receive the command, obtain the temperature data and/or perform other tasks related thereto, as described with reference to FIG. 6. In one example, a command receive/obtain process (e.g., a command receive/obtain process 600) is implemented using one or more of the sub-modules (e.g., one or more of sub-modules 350-358) and is executed by one or more devices, such as one or more network devices 210, as described herein. In one example, network device 210 includes a switch, a director, an appliance and/or another network device. A network device may have processing circuitry. In other examples, other devices, other than network devices, may also receive an obtain temperature data command and/or perform one or more actions to obtain the data. In one example, the network device receiving the command may obtain the temperature data of one or more identified selected units of that device and/or send the command, or an indication of the command, to one or more other network devices (and/or other devices and/or components) to obtain the temperature data of one or more selected units of the one or more other network devices. Various options and examples are possible.

In one example, process 600 executing on a device (e.g., network device 210) receives 610 the command and determines 620 the one or more selected units (e.g., one or more network devices, one or more transceivers (e.g., optical transceivers) of one or more ports, one or more power supply units, one or more chassis, one or more blades, one or more fans, and/or one or more other temperature monitored components) for which temperature data is to be obtained. For instance, process 600 obtains an indication of the one or more selected units from one or more fields (e.g., SAN device address identifier field 560 and/or component identifier field 562) of the command structure (e.g., command structure 550).

Further, process 600 obtains 630 the temperature data for the one or more selected units indicated in the command. For instance, to obtain the temperature levels, the receiving network device requests this information from, e.g., one or more sensors/monitors of one or more of the identified selected units and/or requests the data from other network devices, which obtain the requested data from sensors/monitors of one or more selected units of one or more other network devices. For instance, if temperature data of a network device is requested, then one or more temperature monitors/sensors of the network device provide one or more temperature levels for the network device. Similarly, for a selected component of a network device, one or more temperature monitors/sensors of the selected component provide one or more temperature levels for the component. Other examples are possible.

In one example, based on obtaining the requested data, process 600 constructs 640 a response. This includes, for instance, entering the data in the command structure. For instance, process 600 populates field 566 (temperature value) with the obtained data and, in one example, indicates in field 568 the measurement type (e.g., Kelvin, Celsius, Fahrenheit). Other examples are possible.

Further, the response is transmitted 650 to the transmitting device, which is identified, for instance, by source port address identifier 558 of command structure 550. Other examples are possible.

In one example, the control program (e.g., operating system 224) of the transmitting device receives the response and may take action based on the response. For instance, it may perform and/or signal to deactivate a port, activate a port, and/or mitigate traffic flow to the port(s); perform actions that may increase/decrease the temperature level of a selected unit; initiate and/or perform replacement, repair and/or bypass of a particular component and/or device, etc. The action taken depends, for instance, on the received temperature values and a determination of an approach to be implemented to, e.g., improve the network (e.g., storage area network) to facilitate communication and/or processing within the computing environment. Many variations are possible.

In one or more aspects, a capability is provided to build a command, such as a control unit port command, and send the command to a network device (or other device) of, e.g., a storage area network (or other network) to obtain temperature data of one or more selected units of a storage area network. This enables another device, such as an operating system executing on the other device, to request temperature data, which may be used to improve component operations, communications and processing within a computing environment.

In one example, the operating system (e.g., operating system 224) is afforded the ability to use a structured command, architecturally defined, to request temperature data of one or more selected units of a network. The request by the operating system may be programmatically sent based on information possessed, obtained, determined, perceived, etc. at the operating system side (i.e., not the network device side).

As an example, the command is built and sent by the operating system executing on a non-network device based on I/O configuration data, such as access to an I/O configuration data set, other I/O configuration information and/or performance data (e.g., related to data transmission, etc.). It allows one tool (e.g., the operating system) to have control of the information to be requested and when to request it. It allows the operating system to take action prior and/or subsequent to receiving the data since it has control of when to request the data and/or the data to be requested. It provides the computing environment on which the operating system executes (e.g., the mainframe, etc.) to now have visibility into environmental characteristics (e.g., temperature and/or other environmental characteristics) of the network device and/or device components.

In one example, implementation and use of the command to request the temperature data from network devices/network device components (e.g., transceivers (e.g., optical transceivers) of one or more ports, power supply units, chassis, blades, fans, and/or other temperature monitored components)/network components does not depend on or require knowledge of the specific vendor(s) of the network devices (e.g., of the storage area network) or of the original equipment manufacturer's management software (or others) used by the network devices. The command is not network device- or storage area network-vendor specific, allowing the command to be used by the operating system for network devices/components offered by various vendors.

One or more aspects of the present disclosure are tied to computer technology and facilitate processing within a computer, improving performance thereof. For instance, communication within a computing environment is improved by providing a capability to obtain temperature data of, e.g., one or more selected units of, e.g., a storage area network. A capability is provided for the coupled host device to, for instance, request from one or more storage area network devices/components temperature data of one or more devices/components within a storage area network. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other techniques to request temperature data may be used. Further, services and/or commands may be used to obtain the data, e.g., temperature data. Moreover, additional, less and/or other information may be transmitted/populated using the control unit port command to obtain temperature data. Yet further, networks other than storage area networks may use one or more aspects of the present disclosure. Further, the storage area network may be separate and/or different from storage 124. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

one or more computer readable storage media and program instructions collectively stored on the one or more computer readable storage media, the program instructions collectively stored comprising:

program instructions to obtain, by a receiving network device, a command built by an operating system of a device coupled to the receiving network device to request by the operating system temperature data of one or more selected units of a network, the command including an indication of the one or more selected units for which the temperature data is to be obtained;

program instructions to obtain, by the receiving network device, the temperature data of the one or more selected units indicated by the command; and program instructions to provide, by the receiving network device, a response to the request for the temperature data of the one or more selected units.

2. The computer program product of claim 1, wherein the one or more selected units include one or more temperature monitored components of one or more network devices of the network.

3. The computer program product of claim 1, wherein the one or more selected units include one or more network devices of the network.

4. The computer program product of claim 3, wherein the network is a storage area network, and the receiving network device and the one or more network devices are part of the storage area network.

5. The computer program product of claim 1, wherein the one or more selected units are selected from a group of selected units consisting of one or more network devices, one or more optical transceivers, one or more power supply units, one or more chassis, one or more fans, and one or more selected blades of one or more chassis slots.

6. The computer program product of claim 1, wherein the program instructions to obtain the temperature data of the one or more selected units include program instructions to forward at least an indication of the command to at least one network device coupled to the receiving network device to obtain the temperature data of at least one selected unit of the one or more selected units.

7. The computer program product of claim 1, wherein the command is a control unit port command constructed based on a defined format, the defined format including a command code, an indication of the command name and a description of the command.

8. The computer program product of claim 1, wherein the command uses a command structure built to be used with the command, the command structure provided to the receiving network device and including the indication of the one or more selected units for which the temperature data is to be obtained.

9. The computer program product of claim 8, wherein the command structure further includes one or more fields to include one or more temperature values for the one or more selected units.

10. The computer program product of claim 9, wherein the command structure further includes one or more fields to include a measurement indicator for the one or more temperature values, the measurement indicator indicating a measurement type for the one or more temperature values.

11. A computer system for facilitating processing within a computing environment, the computer system comprising:

a memory; and at least one device coupled to the memory, wherein the computer system is configured to perform a method, the method comprising:

obtaining, by a receiving network device, a command built by an operating system of a device coupled to the receiving network device to request by the operating system temperature data of one or more selected units of a network, the command including an indication of the one or more selected units for which the temperature data is to be obtained;

obtaining, by the receiving network device, the temperature data of the one or more selected units indicated by the command; and providing, by the receiving network device, a response to the request for the temperature data of the one or more selected units.

12. The computer system of claim 11, wherein the obtaining the temperature data of the one or more selected units includes forwarding at least an indication of the command to at least one network device coupled to the receiving network device to obtain the temperature data of at least one selected unit of the one or more selected units.

13. The computer system of claim 11, wherein the command uses a command structure built to be used with the command, the command structure provided to the receiving network device and including the indication of the one or more selected units for which the temperature data is to be obtained.

14. The computer system of claim 13, wherein the command structure further includes one or more fields to include one or more temperature values for the one or more selected units.

15. The computer system of claim 14, wherein the command structure further includes one or more fields to include a measurement indicator for the one or more temperature values, the measurement indicator indicating a measurement type for the one or more temperature values.

16. A computer-implemented method of facilitating processing within a computing environment, the computer-implemented method comprising:

obtaining, by a receiving network device, a command built by an operating system of a device coupled to the receiving network device to request by the operating system temperature data of one or more selected units of a network, the command including an indication of the one or more selected units for which the temperature data is to be obtained;

obtaining, by the receiving network device, the temperature data of the one or more selected units indicated by the command; and providing, by the receiving network device, a response to the request for the temperature data of the one or more selected units.

17. The computer-implemented method of claim 16, wherein the obtaining the temperature data of the one or more selected units includes forwarding at least an indication of the command to at least one network device coupled to the receiving network device to obtain the temperature data of at least one selected unit of the one or more selected units.

18. The computer-implemented method of claim 16, wherein the command uses a command structure built to be used with the command, the command structure provided to the receiving network device and including the indication of the one or more selected units for which the temperature data is to be obtained.

19. The computer-implemented method of claim 18, wherein the command structure further includes one or more fields to include one or more temperature values for the one or more selected units.

20. The computer-implemented method of claim 19, wherein the command structure further includes one or more fields to include a measurement indicator for the one or more temperature values, the measurement indicator indicating a measurement type for the one or more temperature values.

* * * * *